(12) United States Patent
Kulkarni

(10) Patent No.: US 11,368,540 B1
(45) Date of Patent: *Jun. 21, 2022

(54) REMOTE ASSISTANCE FOR A COMPUTING DEVICE FROM A TRUSTED DEVICE

(71) Applicant: Amazon Technologies, Inc., Seattle, WA (US)

(72) Inventor: Mandar Nilkanth Kulkarni, Sunnyvale, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 777 days.

This patent is subject to a terminal disclaimer.

(21) Appl. No.: 14/740,453

(22) Filed: Jun. 16, 2015

(51) Int. Cl.
| | | |
|---|---|---|
| *H04L 67/52* | (2022.01) | |
| *H04W 12/08* | (2021.01) | |
| *H04L 65/1069* | (2022.01) | |
| *G06Q 30/06* | (2012.01) | |
| *G01C 21/36* | (2006.01) | |
| *G01C 21/34* | (2006.01) | |
| *H04W 76/14* | (2018.01) | |

(52) U.S. Cl.
CPC .......... *H04L 67/18* (2013.01); *G01C 21/3415* (2013.01); *G01C 21/3626* (2013.01); *G06Q 30/0643* (2013.01); *H04L 65/1069* (2013.01); *H04W 12/08* (2013.01); *H04W 76/14* (2018.02)

(58) Field of Classification Search
CPC . H04L 67/18; H04L 65/1069; G01C 21/3415; G01C 21/3626; G06Q 30/0643; H04W 12/08; H04W 76/023
See application file for complete search history.

(56) References Cited

U.S. PATENT DOCUMENTS

| | | | |
|---|---|---|---|
| 8,078,972 B2 | 12/2011 | Sullivan et al. | |
| 8,374,628 B1* | 2/2013 | Nelissen | H04W 4/023 |
| | | | 455/414.1 |
| 9,009,334 B1 | 4/2015 | Jenkins et al. | |
| 2006/0277096 A1 | 12/2006 | Levitus | |
| 2007/0127696 A1 | 6/2007 | White | |
| 2009/0233629 A1* | 9/2009 | Jayanthi | H04L 12/5865 |
| | | | 455/457 |
| 2012/0297311 A1* | 11/2012 | Duggal | G06F 9/468 |
| | | | 715/740 |
| 2012/0317487 A1 | 12/2012 | Lieb et al. | |

(Continued)

OTHER PUBLICATIONS

Fitzpatrick, "Share Apps, Music, and Videos with Apple Family Sharing on iPhone / iPad", published: Mar. 25, 2015, How-To Geek, https://www.howtogeek.com/212823/share-apps-music-and-videos-with-apple-family-sharing-on-iphone-ipad/.*

(Continued)

*Primary Examiner* — Seth A Silverman
(74) *Attorney, Agent, or Firm* — K&L Gates LLP

(57) ABSTRACT

Systems and methods for providing context-specific support from trusted contacts are provided. A software application residing on the computing device may be associated with a trusted contact for providing remote support to the user. When such a trusted contact exists, a "Help" button is displayed on the computing device when the software application is in use. The user may select that button to cause the computing device to automatically contact the trusted contact and establish a screen sharing communication session with a computing device associated with the trusted contact.

21 Claims, 13 Drawing Sheets

(56) References Cited

U.S. PATENT DOCUMENTS

| | | | |
|---|---|---|---|
| 2013/0030948 A1* | 1/2013 | Fisher, Jr. | G06Q 10/06 705/26.5 |
| 2013/0330054 A1 | 12/2013 | Lokshin | |
| 2014/0007222 A1 | 1/2014 | Qureshi et al. | |
| 2014/0029478 A1* | 1/2014 | Bhagavatula | H04L 65/1053 370/271 |
| 2014/0342753 A1* | 11/2014 | DeMerchant | H04W 4/02 455/456.2 |
| 2014/0365901 A1 | 12/2014 | Moha et al. | |
| 2015/0052122 A1 | 2/2015 | Landry et al. | |

OTHER PUBLICATIONS

Anyweb, "How can I remotely control WORKGROUP computers in System Center 2012 Configuration Manager ?", published: Sep. 3, 2013, Windows-noob.com, https://www.windows-noob.com/forums/topic/8977-how-can-i-remotely-control-workgroup-computers-in-system-center-2012-configuration-manager/.*

Fitzpatrick, "Share Apps, Music, and Videos with Apple Family Sharing on iPhone / iPad", published: Mar. 25, 2015, How-To Geek, https://www.howtogeek.com/212823/share-apps-music-and-videos-with-apple-family-sharing-on-iphone-ipad/ (Year: 2015).*

Anyweb, "How can I remotely control WORKGROUP computers in System Center 2012 Configuration Manager ?", published: Sep. 3, 2013, Windows-noob.com, https://www.windows-noob.com/forums/topic/8977-how-can-i-remotely-control-workgroup-computers-in-system-center-2012-configuration-manager/ (Year: 2013).*

Author Unknown, "Representative Guide 13.1 Enterprise Licensing," BOMGAR, 77 pages (Nov. 4, 2013).

Gomez et al., RERAN: Timing- and Touch-Sensitive Record and Replay for Android, ICSE pp. 72-81, (2013).

* cited by examiner

REMOTE ASSISTANCE FOR A COMPUTING DEVICE FROM A TRUSTED DEVICE

BACKGROUND

A navigation application on a mobile computing device, such as a smartphone, can be tremendously helpful for a user trying to drive to an unfamiliar destination. That same smartphone can also be used to place voice calls to friends or family, who can verbally provide directions to the driver. However, it is often difficult for the driver to describe his current location to the person giving directions because street names or other landmarks may be difficult to see. And if the driver is continuing to drive during the call, the driver's location is continuously changing, so any description that the driver provides regarding his current location will quickly become inaccurate. Therefore, it is challenging for that person to provide turn-by-turn directions based on the driver's current location. This also requires that the person giving directions remain on the phone with the driver and provide ongoing directions as the driver proceeds to the destination. Even if the person on the phone can tell the driver the precise address of the desired destination, it is difficult and dangerous for the driver to manually enter that address into the navigation application while driving.

Accordingly, there is a need for improved methods of remotely providing guidance to a computing device user.

DETAILED DESCRIPTION

In the following description, reference is made to the accompanying drawings that illustrate several embodiments of the present disclosure. It is to be understood that other embodiments may be utilized and system or process changes may be made without departing from the spirit and scope of the present disclosure. The following detailed description is not to be taken in a limiting sense, and the scope of the embodiments of the present invention is defined only by the claims of the issued patent. It is to be understood that drawings are not necessarily drawn to scale.

Various embodiments of the present disclosure provide improved systems and methods for remote support for a first user at a first computing device by second user at a second computing device. The first user may initially contact the second user by placing a telephone call to the second user. The first computing device then initiates a screen sharing support session with the second computing device, whereby the second user can use the second computing device to remotely view and interact with the navigation application currently being displayed on the first computing device. The second user may use the second computing device to view the first user's current location on the navigation application, and then enter a destination address into the navigation application of the first computing device. The first user may then proceed with driving to the destination as guided by the turn-by-turn directions provided by the navigation system.

In other embodiments, context-specific support from trusted contacts may be provided. For example, a software application residing on the first computing device may be associated with one or more trusted contact profiles for providing remote support to the first user. When such a trusted contact profile exists, a "Help" button is displayed on the first computing device when the software application is in use. If the first user needs assistance with the software application and the "Help" button is displayed, the first user may select that button to cause the first computing device to automatically contact the trusted contact profile. A communication session may then be established between the first computing device and a second computing device associated with the trusted contact profile, so that the trusted contact may provide the first user with the desired assistance. The second computing device is a device that is associated with the trusted contact profile and is authorized to access the contact's profile.

Figure 1A:
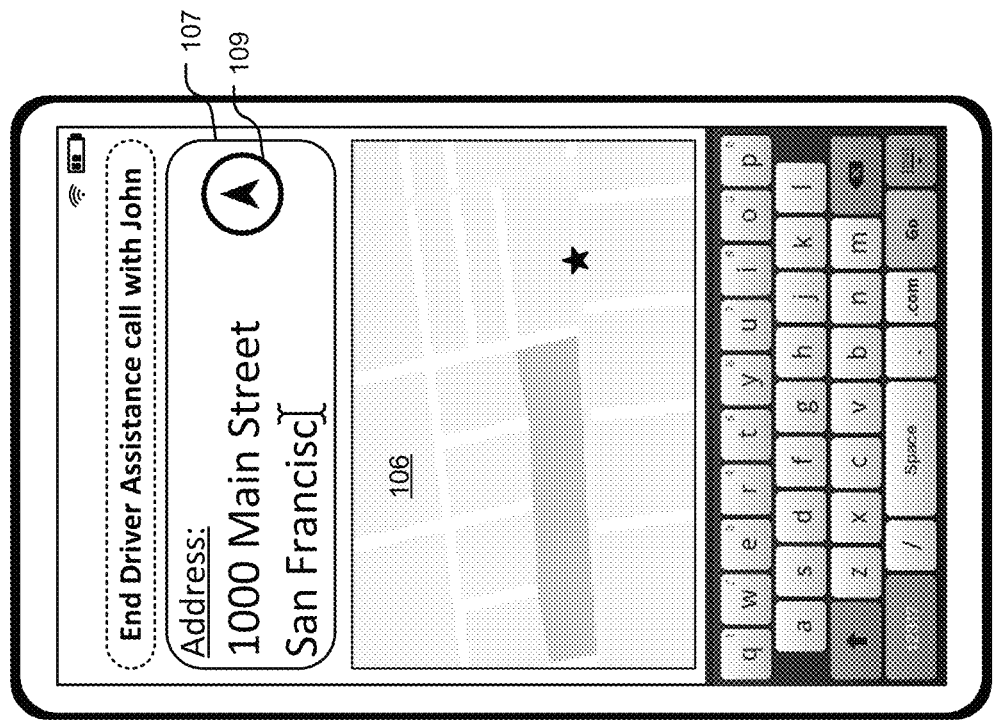
FIGS. 1A-1B are block diagrams illustrating a support system, in accordance with embodiments of the present invention.
Figure 1A:
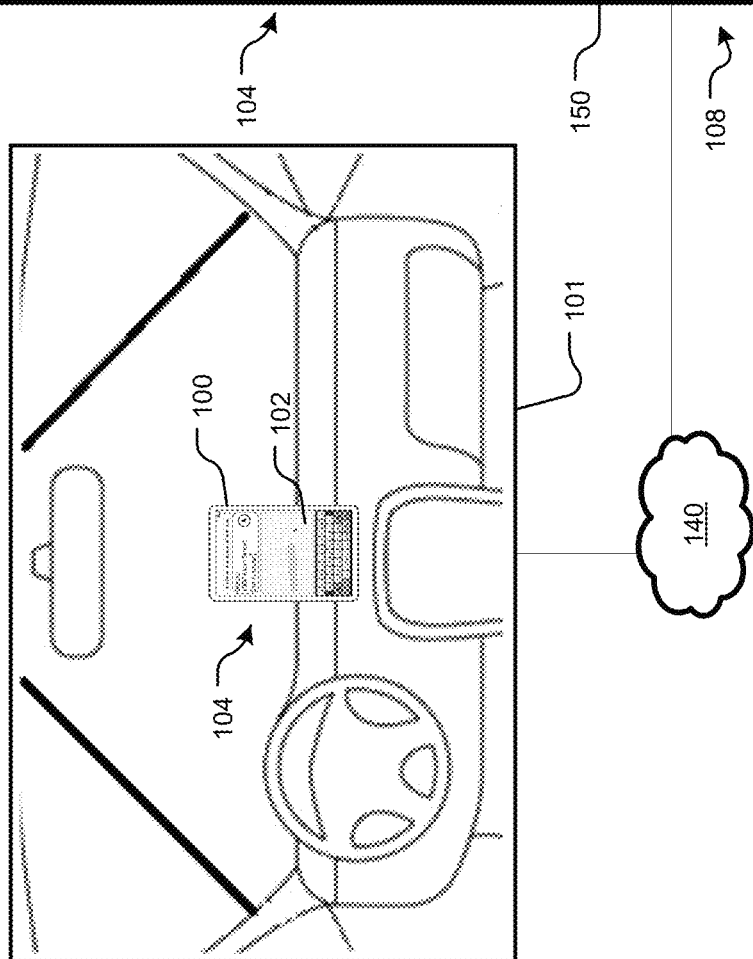

In accordance with aspects of the present invention, systems and methods for remote support for a first user at a first computing device by second user at a second computing device are provided. FIG. 1A is a block diagram illustrating a support system, in accordance with embodiments of the present invention. In FIG. 1A, a first user driving a car 101 has a first computing device 100 supported by a dashboard cradle. The first computing device 100 could be, for example, a smartphone device with a touchscreen display 102 for receiving user inputs. The first user (i.e., the driver) may initiate or receive a telephone call with a second computing device 150. The second computing device 150 could also be a smartphone by the same or different manufacturer, running the same or different operating system as the first computing device 150, or be an entirely different type of computing device, such as a desktop or tablet computer.

During the call, the first user may tell the second user that he wishes to reach a certain destination, such as, for example, the second user's home, but he does not have the second user's home address. In a conventional situation, the second user would verbally speak the home address during the voice call, and after the call was terminated, the driver would manually enter the home address into a navigation application using a keypad user interface on the first computing device 100. Entering this information while driving would create a hazardous situation that might be prohibited by the applicable motor vehicle laws. Therefore, the driver would pull the car over before entering the address into the navigation system. Alternatively, if the navigation application is configured to receive voice inputs, the driver may be able to provide the destination information to the navigation application by speaking. In either case, the driver would first have had to memorize the address spoken by the second user, which is inconvenient and prone to error.

Instead, in accordance with embodiments of the present invention, the driver may establish a screen sharing support session with the second computing device 150 whereby the first computing device 100 provides the second computing device 150 with access to the navigation application on the first computing device 100. This can be accomplished by transmitting the user interface (UI) content 104 currently being displayed on the display 102 of the first computing device 100 to the second computing device 150. The UI content 104 may comprise an operating system user interface or the interface of one or more software applications that may run on the first computing device 100. UI data representing at least a portion of this UI content 104 can be transmitted from the first computing device 100 to the second computing device 150 via a network 140, such as, for example, the Internet, intranets, extranets, wide area networks (WANs), local area networks (LANs), wired networks, wireless networks, or other suitable networks, or any combination of two or more such networks. UI data representing the UI content 104 may include a copy of the UI content 104, data representing pixel changes relative to a previous frame rendered as part of the UI content 104, and/or any other type of data the second computing device 150 can process to render displays that show at least a portion of the UI content 104 in near real time. To avoid unnecessarily complicating the discussion, reference to the UI content 104 is often made herein where UI data representing at least a portion of the UI content 104 could be referenced instead.

The second computing device 150 may then display that UI content 104 for viewing by the second user, as shown in FIG. 1A. The second user may then view a live map 106 displayed by the navigation application to view the driver's current location. The second user can then be constantly aware of the driver's current location in real time, even if the driver is continuing to drive and therefore changing location. If the second user is familiar with the street at the driver's current location, the second user can then provide verbal directions to the driver in real time. For example, the second user can provide turn-by-turn directions to the driver, such as, "at the next intersection, take a right turn." In addition, the UI content 104 may enable the second user to provide more detailed or more helpful directions than the turn-by-turn directions typically provided by navigation systems. For example, the second user may tell the driver, "one block after you pass the park on your right, you need to take a sharp right turn, so stay in the right lane and slow down."

In accordance with embodiments of the present invention, the second user may be able to provide additional support by generating control inputs to be executed by the first computing device 100. For example, as shown in FIG. 1A, both the first computing device 100 and the second computing device 150 are displaying the same UI content 104 of the navigation application on the first computing device 100. The navigation application includes a destination field 107, into which a user may type a desired destination name or address. While the second computing device 150 is in a support session with the first computing device 100, the second user may enter the destination information directly into the navigation application using the second computing device 150 as if the second user was directly interacting with the first computing device 100. Therefore, the second user can use the second computing device 150 to interact with the image of the on-screen virtual graphical keyboard 108 from the second computing device 150. If the second computing device 150 includes a touchscreen display, the second user may tap on the virtual keys shown on the display to generate control inputs selecting those virtual keys.

The second computing device 150 sends those control inputs to the first computing device 100 via the network 140. The first computing device 100 is programmed to receive these control inputs from the second computing device 150 and to execute those control inputs as if they had been entered by the first user using the touchscreen display 102 of the first computing device 100. In this way, the second user may type the address of the destination using the virtual keyboard 108 into the navigation application, and then press the navigate icon 109 control element to cause the navigation application to begin providing navigation guidance to the entered destination address. The first user can then follow the audio turn-by-turn directions generated by the navigation application in order to reach the destination address. The first user can maintain an ongoing voice call with the second computing device 150 throughout the process, or can terminate the voice call at any point. The first computing device 100 can be programmed to maintain the support session with the second computing device 150 despite termination of the voice call, or can be programmed to automatically terminate the support session upon termination of the voice call, thereby terminating the second user's ability to view and interact with the UI content 104 from the first computing device.

Figure 1B:
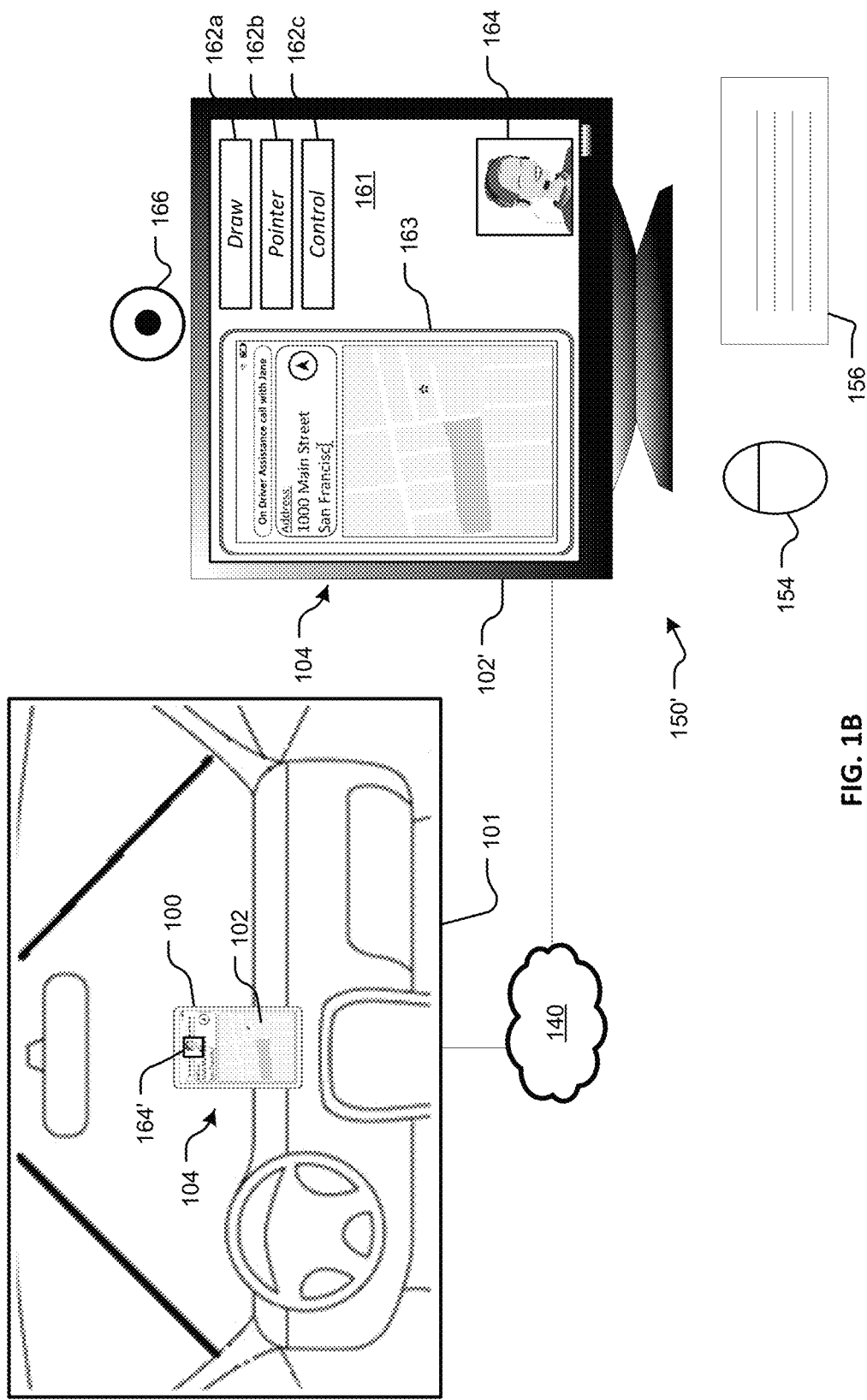

FIG. 1B is a block diagram illustrating a support system in accordance with other embodiments of the present invention. In the embodiment shown in FIG. 1A, both the first computing device 100 and the second computing device 150 are smartphones having touchscreen displays. In the embodiment shown in FIG. 1B, the first computing device 100 remains a smartphone having a touchscreen display 102, but the second computing device 150' is a personal computer with a standard, non-touch monitor 102' and running a support application 161. The second computing device 150' may also include a microphone and speakers or a headset to enable the second user to conduct a voice call with the first computing device 100. The second computing device 150' may utilize Voice over IP (VoIP) software to facilitate the voice call.

Unlike the touchscreen display 102, the user input devices for the second computing device 150' are a standard mouse 154 and keyboard 156. In this embodiment, a substantially real-time live feed of the UI content 104 from the first computing device 100 is shown in a simulated device portion 163 of the support application 161 displayed on the monitor 102'. This simulated device portion 163 enables the second computing device 150' to display the UI content 104 from the first computing device 100 on the monitor 102' of the second computing device 150', despite the fact that the display 102 and monitor 102' have different resolutions, orientations, and/or aspect ratios. In addition, many mobile computing devices are configured to dynamically change the UI orientation, depending on the orientation in which the device is held by the user. Therefore, the simulated device portion 163 may switch from portrait to landscape mode in the middle of a support session if the first user changes the orientation of the first computing device 100. The support application 161 is configured to adjust the screen sharing UI content 104 to reflect the current orientation of the user computing device 100.

As in the embodiment illustrated in FIG. 1A, the second user may view and interact with the UI content 104 from the first computing device 100 by generating control inputs that are transmitted from the second computing device 150' to be executed by the first computing device 100. However, because the second computing device 150' lacks a touchscreen display, the second user will utilize the mouse 154 and/or keyboard 156 to simulate touch inputs to the first computing device 100. For example, the second user may use the mouse 154 to position a cursor over a portion of the UI content 104 and then click on the mouse button. In response to receiving this user input from the mouse 154, the support application 161 generates a control input corresponding to a touch on the UI content 104 and will transmit that control input to the first computing device 100.

In accordance with other embodiments, the second computing device 150' may provide the second user with additional functionality. For example, the support application 161 may include one or more support tools 162a-162c, which the second user may utilize to provide additional guidance to the first user. In the illustrated embodiment, the support application 161 includes a drawing tool 162a, a pointer tool 162b, and a control tool 162c. The second user may utilize the peripheral input devices 154, 156 to select one of the tools 162a-162c and then interact with the UI content 104 in the simulated device portion 163 using that tool to produce the desired result on the first computing device 100.

The drawing tool 162a provides a graphics editor function that enables the second user to utilize one or more graphics tools to create graphical elements to be displayed on top of the UI content 104. The graphics tools may enable the second user to draw freeform and/or non-freeform shapes, such as a line, curve, or box, or to add text or other images. Graphical image data representing these graphical elements can be transmitted as, e.g., raster or vector graphics images, to the first computing device 100, where the graphical elements are displayed on top of the UI content 104 on the first computing device 100. The second user may use these graphical elements to provide visual guidance to the first user, such as to highlight a location on the map 106. The graphical elements can be transmitted as a live, streaming feed to the first computing device 100 as they are generated by the second user, so the first user can see an animated display of the graphical elements. In other embodiments, the graphical elements may be transmitted as static images to the first computing device 100. These static images can be drawn by the second user using the second computing device 150' and be periodically transmitted to the first computing device 100 automatically or manually by the second user.

The pointer tool 162b provides the second user with a graphical element comprising a pointer arrow icon that the second user can move over the UI content 104 without leaving a trail or other persistent image, as would occur if using the drawing tool 162a. The second user may move the pointer arrow icon over the UI content 104 to draw the first user's attention to various elements displayed in the UI content 104. The pointer tool 162b provides a transient graphical element that the first user can observe as it is manipulated by the second user, but does not leave a persistent image on the display 102. The pointer arrow icon can function in a similar fashion as the mouse pointer used in traditional graphical user interfaces for selecting items.

As described above, it may be desirable for the second user to perform tasks directly on the first computing device 100. The control input tool 162c provides the second user with the ability to produce control inputs that are received by the first computing device 100 and recognized as user inputs as if the user had provided those inputs using, for example, the touchscreen display 102. The control input tool 162c may provide the second user with a pointer or other cursor that the second user may move across the surface of the UI content 104 using the mouse 154, with touch inputs being generated using, for example, the buttons on the mouse 154 or keyboard 156.

The second computing device 150' may also include a webcam 166 for capturing a live streaming video of the second user at the second computing device 150'. The support application 161 may include a video image 164 so that the second user may view the streaming video, and the same streaming video data can be transmitted for display as video image 164' on the first computing device 100.

Figure 2A:
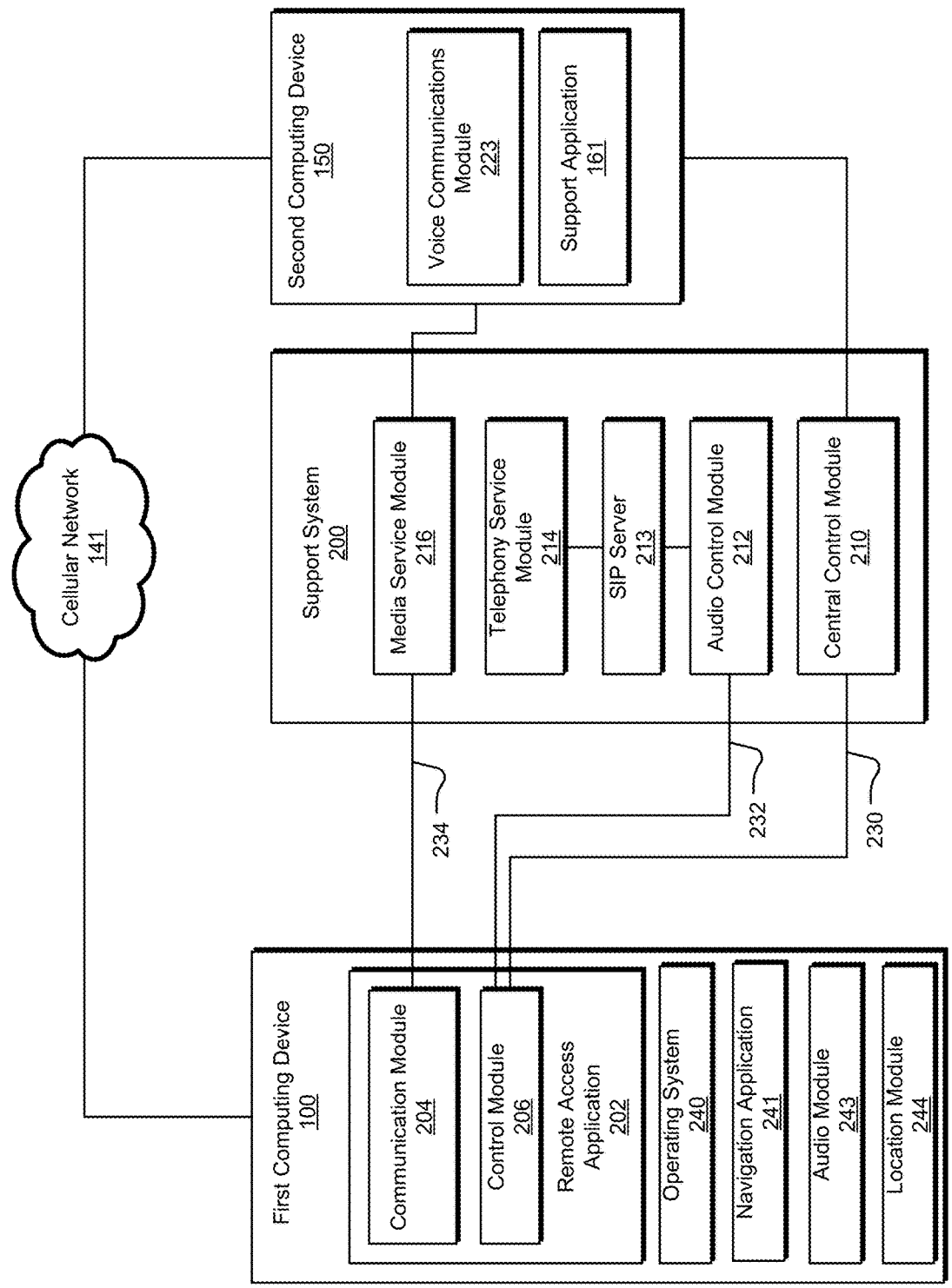
FIGS. 2A-2B are block diagrams illustrating exemplary environments in which embodiments of the present invention may be implemented.
Figure 2B:
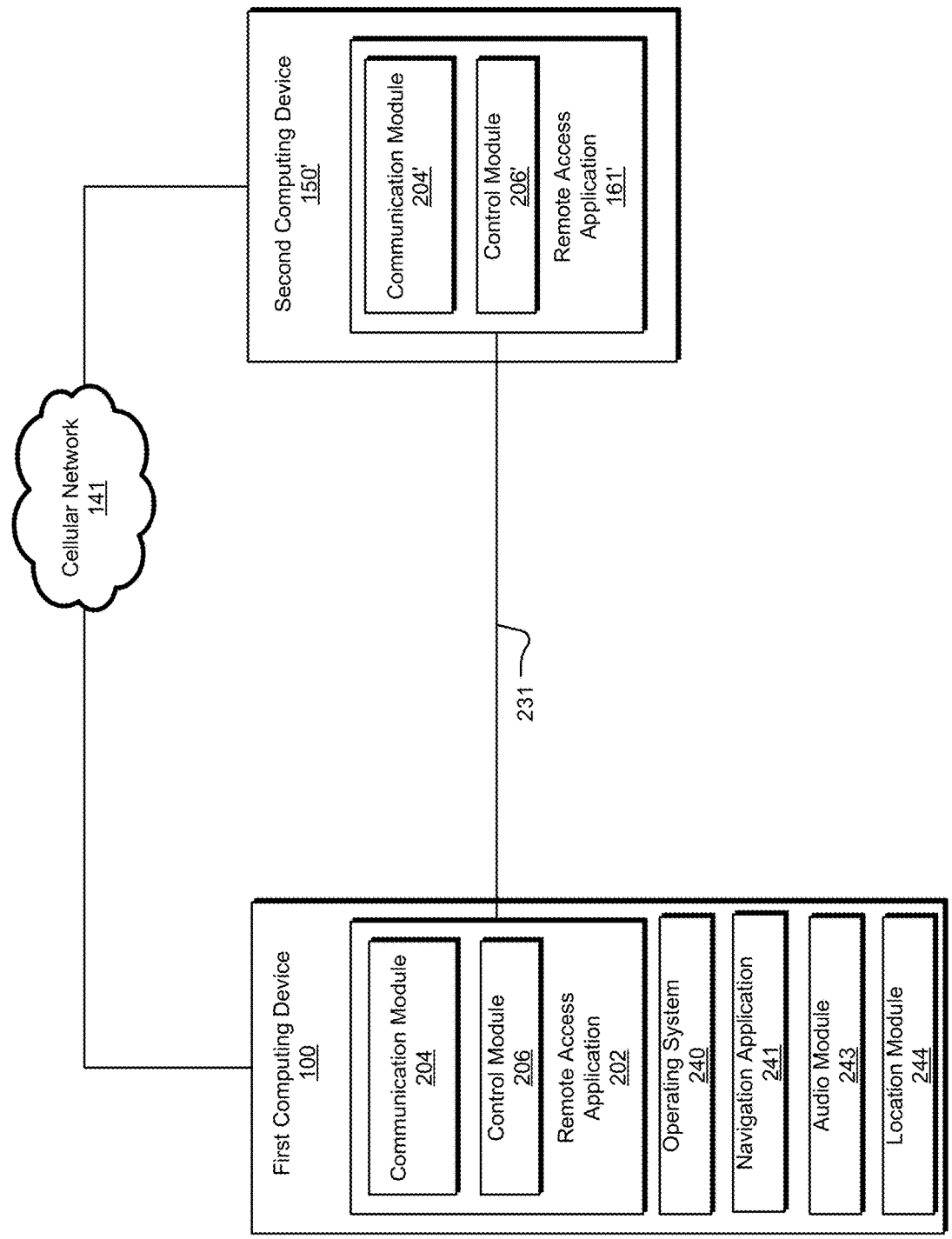

The support session between the first computing device 100 and the second computing device 150 may be implemented using any desired technology. FIGS. 2A-2B are block diagrams illustrating exemplary environments in which embodiments of the present invention may be implemented. FIG. 2A is a block diagram illustrating an exemplary environment in which a support system 200 may be used to facilitate the voice and/or data communications between the first computing device 100 and the second computing device 150. Although various components are illustrated as discrete blocks in FIG. 2, it is to be understood that the blocks are merely illustrative and the functionality of each component may be implemented using software executing one or more computing devices, such as a series of servers located in different physical locations.

The support system 200 may include a central control module 210, an audio control module 212, a Session Initiation Protocol (SIP) server 213 (or other communications server), a telephony service module 214, and a media service module 216.

The first computing device 100 is provided with a processing element and memory configured to execute various software applications, including a remote access application 202 comprising a communication module 204 and a control module 206. The remote access application 202 may be used to facilitate the voice calls and/or screen sharing support sessions between the first computing device 100 and the second computing device 150.

The first computing device 100 may include an operating system 240, such as the Fire OS operating system by Amazon.com, Inc., the Android operating system by Google, Inc., as well as other Linux-based operating systems, Windows-based operating systems by Microsoft Corp., or iOS-based operating systems by Apple Inc. The remote access application 202 may comprise a software application operating in the applications layer of the operating system. The communication module 204 may implement, for example, a protocol for real-time communication, such as WebRTC. The communication module 204 enables the real-time, one-way or two-way media streaming between the remote access application 202 running on the first computing device 100 and the support application 161 on the second computing device 150. When the first computing device 100 is running the Android operating system, the communication module 204 may utilize a WebView element to render the graphical content provided by the second computing device 150 and displayed on top of the UI content 104.

In addition to the navigation application described above (shown in FIG. 2A as navigation application 241), the first computing device 100 may include additional software applications, such as, e.g., calendar, contacts, camera, video view, e-mail, phone, browser, software application store, and e-book reader applications.

The first computing device 100 also includes an audio module 243, which may provide audio input and/or output functionality. The audio module 243 may comprise one or more speakers, an audio output jack for external speakers such as earbuds or headphones, and a microphone.

The second computing device 150 includes a processing element and memory configured to execute various software applications, including the support application 161 and a voice communications module 223, which may include a voice communications headset or other microphone and speaker hardware, and corresponding software for handling voice communications between the second computing device 150 and the first computing device 100.

The central control module 210 may comprise a management application running on a computer server in the support system 200. The central control module 210 may be programmed to handle control and communication between a plurality of computing devices and other components of the support system 200. For example, a broadcast or message from the first computing device 100 to the second computing device 150 may be routed via the central control module 210, or alternatively, may be routed via the media service module 216. When the first user initiates a support session with the second computing device 150, the remote access application 202 establishes a connection with the central control module 210 via a session control channel 230.

If the first computing device 100 and second computing device 150 are not utilizing the conventional cellular network 141 for voice communications, the audio control module 212 may be used to manage the voice communication between the first computing device 100 and the second computing device 150. The audio control module 212 may comprise a session border controller (SBC) to manage VoIP communications between the first computing device 100 and the agent computing device 150, including management of quality of service (QoS) parameters, such as rate limiting, bitrate management, and the like. The audio control module 212 receives the voice data via audio channel 232 and passes the voice data to the telephony service module 214. The telephony service module 214 then routes the voice communication to the second computing device 150. The audio channel 232 can establish the voice session using a signaling communications protocol such as the Session Initiation Protocol (SIP) and a transport protocol such as the Real-time Transport Protocol (RTP).

The media service module 216 handles the graphical media streaming between the first computing device 100 and the second computing device 150. The media service module 216 may be implemented as a computer server implementing a Traversal Using Relays around NAT (TURN) protocol for handling data over Transmission Control Protocol (TCP) and User Datagram Protocol (UDP) connections. The graphical media streaming handled by the media service module 216 can include one or more of the screen-sharing graphics from the first computing device 100, the graphical elements 122 from the second computing device 150, and the video image 164 of the second user. The media streaming between the communication module 204 and the media service module 216 via WebRTC can be provided over a media channel 234. In some embodiments, the graphical elements 122 from the second computing device 150 may be transmitted from the central control module 210 to the control module 206 on the first computing device 100 via session control channel 230.

FIG. 2B is a block diagram illustrating another exemplary environment in which the first computing device 100 and the second computing device 150' communicate directly with each other without the use of an intermediary support system 200 to coordinate communications. In this embodiment, the second computing device 150' includes a remote access application 161' comprising a communication module 204' and a control module 206'. The first computing device 100 initiates the support session by transmitting a message to the second computing device 150' and establishes a link 231 between the remote access application 160 on the first computing device 100 and the remote access application 160' on the second computing device 150'. The communications between the devices 100 and 150', including sharing of UI content 104 and transmission control inputs, may be handled by the remote access application 160 and the remote access application 160'.

Figure 3:
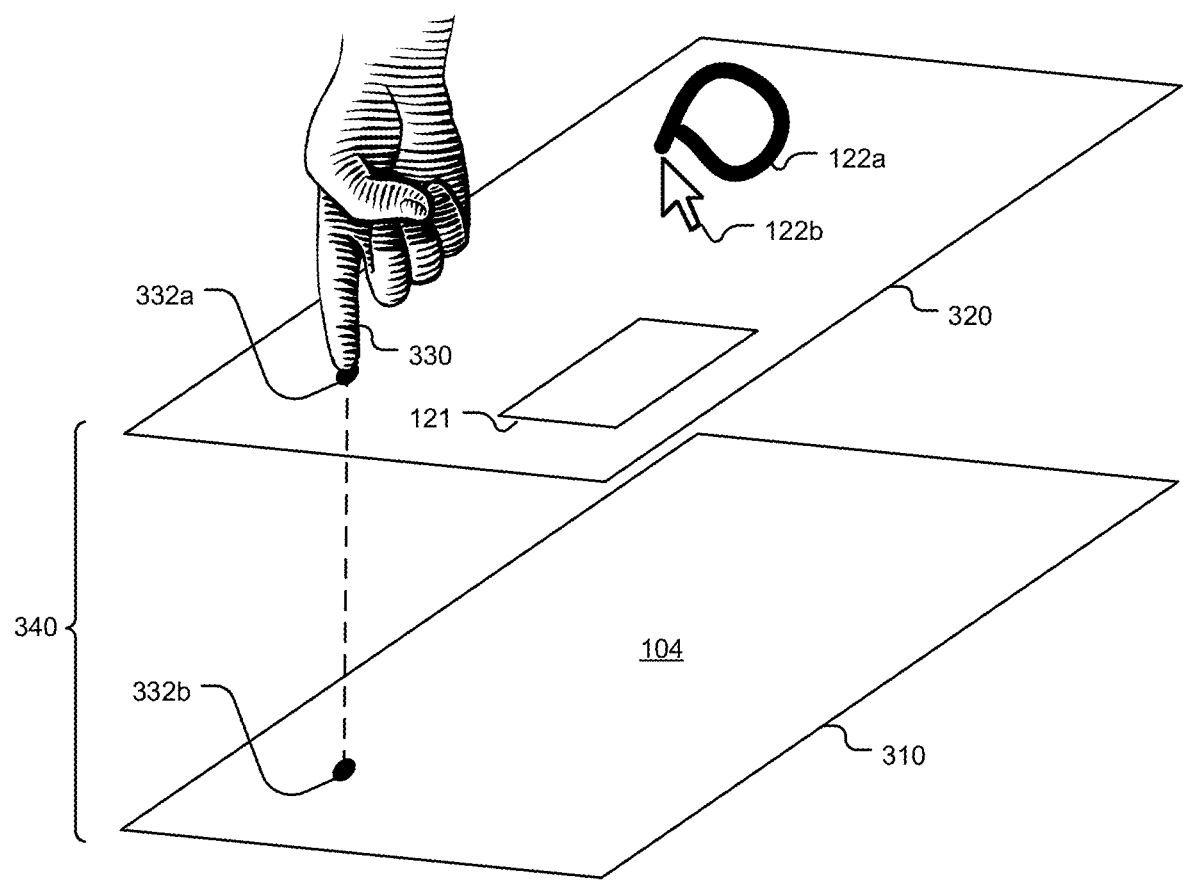
FIG. 3 illustrates the detection of touch inputs in a support session interface, in accordance with embodiments of the present invention.

FIG. 3 illustrates the detection of touch inputs in a support session interface, in accordance with embodiments of the present invention. As described above, a second user at the second computing device 150 may generate graphical elements that are transmitted to the first computing device 100 to be displayed on the first computing device 100 on top of the user's UI content 104. These graphical elements may be used by the second user to communicate with the first user.

During normal operation of the first computing device 100, the display component 102 displays UI content 104 in a UI layer 310. The UI layer 310 may comprise, for example, a window or frame filling all or a portion of the display area of the first computing device 100. The UI content 104 displayed in the UI layer 310 includes, for example, the UI of the operating system 240, or the interface of one or more software applications running on the first computing device 100.

During screen sharing support sessions, a support session interface 340 is displayed by the display 102 of the first computing device 100. The support session interface 340 may include multiple logical layers, with the content in each layer being combined and rendered in the support session interface 340. In the embodiment illustrated in FIG. 3, a support content layer 320 is generated and displayed on top of the UI layer 310 in the support session interface 340. The support content layer 320 is transparent, so as to enable the first user to view all of the content displayed in the UI layer 310 through the support content layer 320. However, any graphical elements generated by the second computing device 150 and transmitted to the first computing device 100 are displayed in the support content layer 320. These graphical elements may be partially transparent, thereby enabling the user to view the content in the UI layer 310 below, or opaque, thereby blocking the view of the content in the UI layer 310 below.

It may be desirable to permit the first user to continue to interact with the elements displayed in the UI layer 310, even when the support content layer 320 is displayed overlaying the UI layer 310. On touch-enabled computing devices, the first user may interact with the elements displayed on the computing device by touching one or more fingers 330 to the display 102. The contact of the finger 330 to the display is detected as a touch input by the first computing device 100. When a transparent support content layer 320 is displayed on top of the UI layer 310, the user's touch input 332*a* may be detected by the first computing device's hardware and passed to the software producing the UI layer 310 (e.g., the navigation application 241) as a touch input 332*b* to the same location on the display as the original touch input 332*a*. In this way, the first user may continue to interact with the underlying UI content 104 displayed in the UI layer 310 while the second user is providing support to the first user.

In accordance with embodiments of the present invention, audio communications between the first user and the second user may be provided via a telephone call from the first computing device 100 to the second computing device 150 and may be initiated before or after the remote access application 202 is launched on the first computing device 100 and the support session is initiated between the first computing device 100 and the second computing device 150.

In other embodiments, the first user may initiate the support session between the first computing device 100 and the second computing device 150 before a telephone call is established with the second user. After the first user launches the remote access application 202, the remote access application 202 may prompt the first user to select the person to contact for assistance. Typically, a user may not want to provide everyone with access privileges to view and interact with the first computing device 100. Therefore, the remote access application 202 may present a list of contacts who were previously identified as trusted contacts to whom remote access privileges to the first computing device 100 should be granted.

Figure 4:
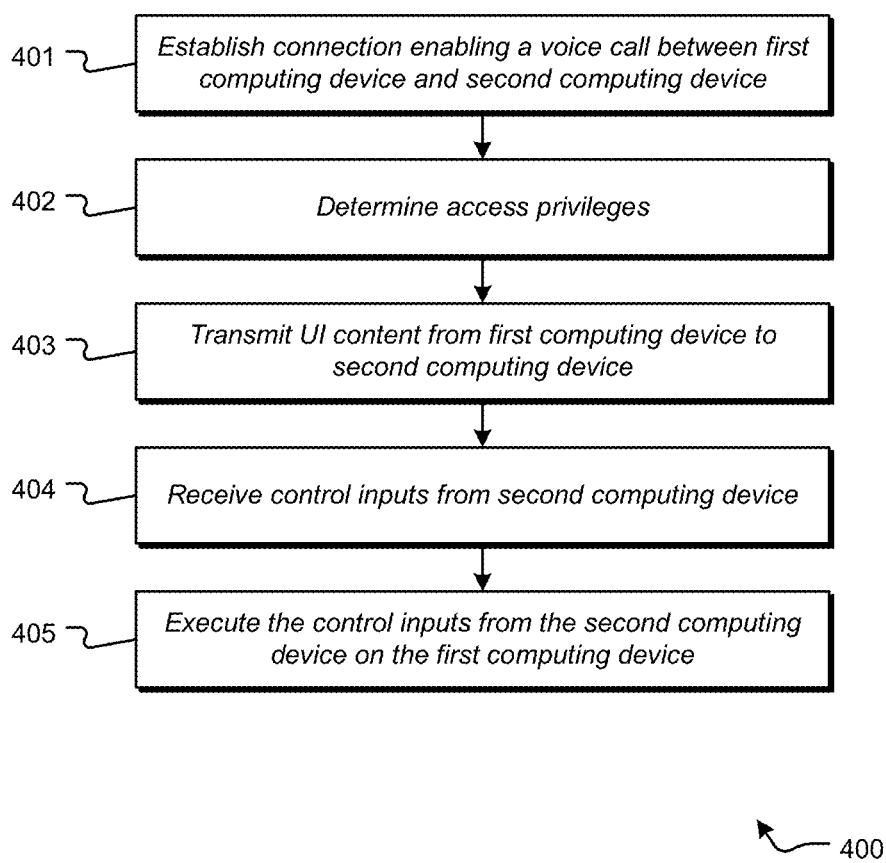
FIG. 4 is a flowchart illustrating a method of providing remote access, in accordance with embodiments of the present invention.

FIG. 4 is a flowchart illustrating a method 400 of providing remote access to a first computing device 100, in accordance with embodiments of the present invention. In step 401, a connection enabling a voice call is established between the first computing device 100 and the second computing device 150. This call may have been initiated by either computing device 100, 150.

In step 402, it is determined whether an entity associated with the second computing device 150 has access privileges to the first computing device 100. This determination can be performed in a variety of ways. For example, the first user may have previously identified one or more trusted contacts to whom the first user wishes to grant access privileges. These trusted contacts and their respective access privileges may be stored in a trusted contact list stored locally in a memory of the first computing device 100 or on a remote server queried by the first computing device 100. In some embodiments, each time a phone call made on the first computing device 100 (either an inbound call or an outbound call), the first computing device 100 is programmed to determine whether the phone number of the other party to that call is associated with one of the trusted contacts in the trusted contact list. If so, then the first computing device 100 may automatically grant remote access to the other party, may grant remote access if requested by the second computing device 150, or may only grant remote access to the second computing device 150 after the first user provides an input authorizing such access.

In yet other embodiments, the determination can be made based on an input from the first user. For example, the phone application on the first computing device 100 may include a control element (e.g., a button) which, when selected, establishes a remote access support session with the other party to the telephone call currently in progress.

In yet other embodiments, the determination may be made prior to the initiation of the phone call between the first computing device 100 and the second computing device 150. For example, the first user may launch a remote access application 202 on the computing device 100, which then prompts the first user to initiate a phone call and remote access support session with a contact selected by the first user. The remote access application 202 may display the trusted contact list, and the first user may select the contact to be called. Alternatively, the remote access application 202 may display a telephone dial pad, and the first user may dial the phone number of the person with whom the first user wishes to establish a support session.

Next, the support session between the first computing device 100 and the second computing device 150 is conducted. In step 403, UI content 104 currently being displayed on the first computing device 100 is transmitted to the second computing device 150. In step 404, the first computing device 100 receives control inputs from the second computing device 150. Finally, in step 405, the first computing device 100 executes the control inputs from the second computing device 150 in, for example, a navigation application running on the first computing device 100.

FIGS. 5A-5D are screen shots of a first smartphone computing device 100 and a second smartphone computing device 150 performing a method of providing remote access, in accordance with embodiments of the present invention. Although the figures show identical devices 100, 150 having similar user interfaces, it is to be understood that different types of computing devices may be utilized by the first user and second user and the user interfaces may differ.

Figure 5A:
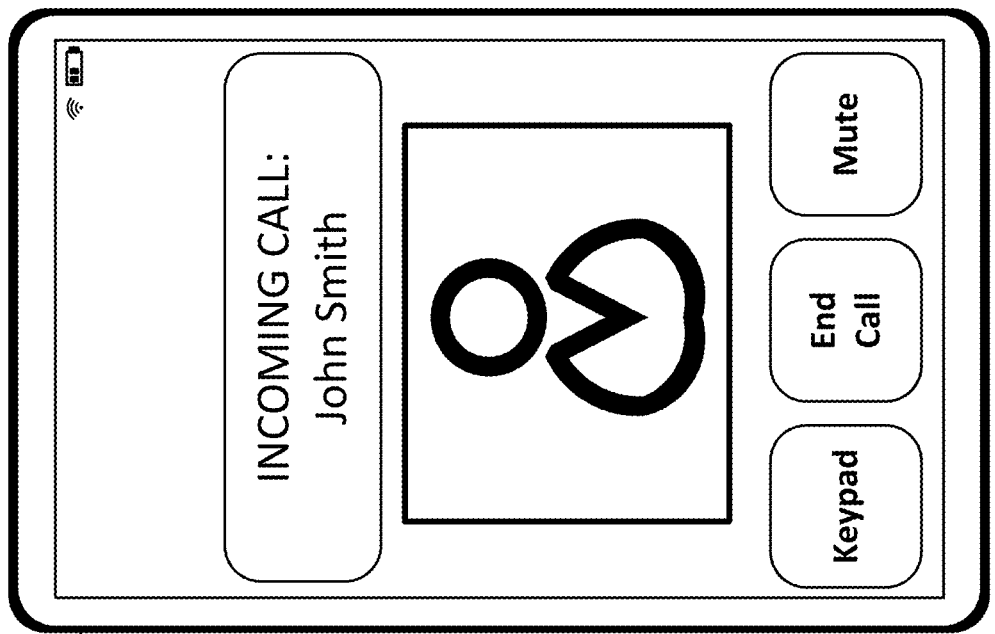
FIGS. 5A-5D are illustrative screenshots of computing devices conducting a remote access support session, in accordance with embodiments of the present invention.
Figure 5A:
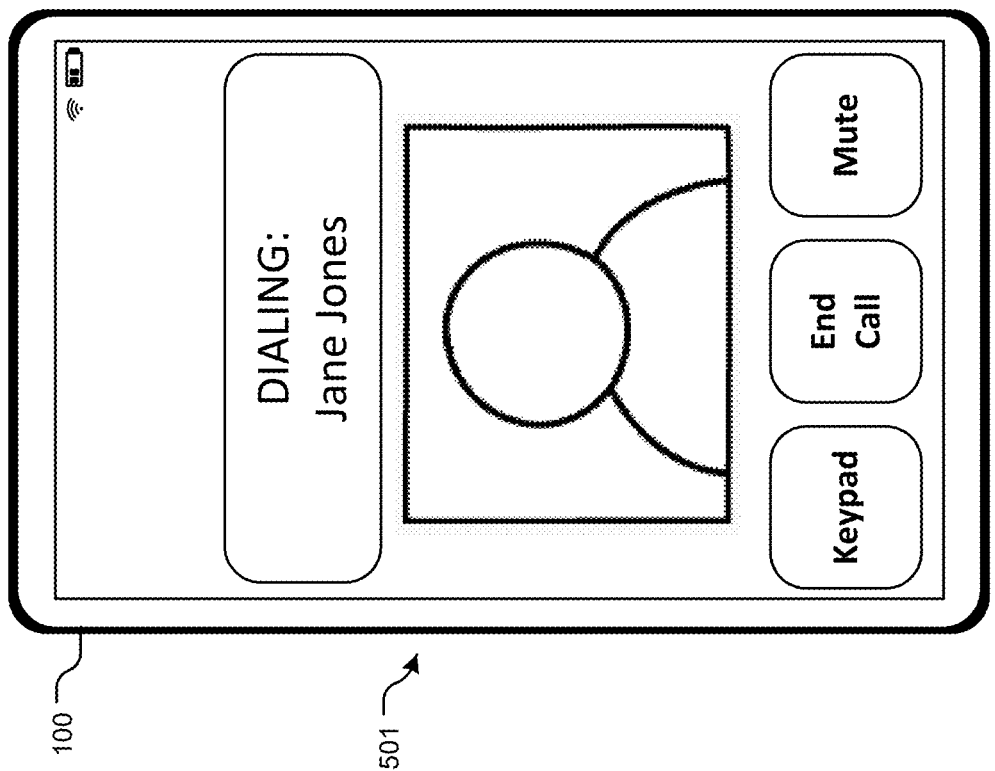

In this example, John Smith is attempting to drive his car to a restaurant where he hopes to meet Jane Jones, but is having difficulty finding the restaurant. FIG. 5A shows a first phone interface screen 501 of a first computing device 100 placing a telephone call to Jane Jones at a second computing device 150, and a second phone interface screen 502 of the second computing device 150 receiving a telephone call from John Smith at the first computing device 100. Because John is driving, he may place this call using a hands-free interface on his phone or his car, which has a short-range wireless connection with his phone.

Figure 5B:
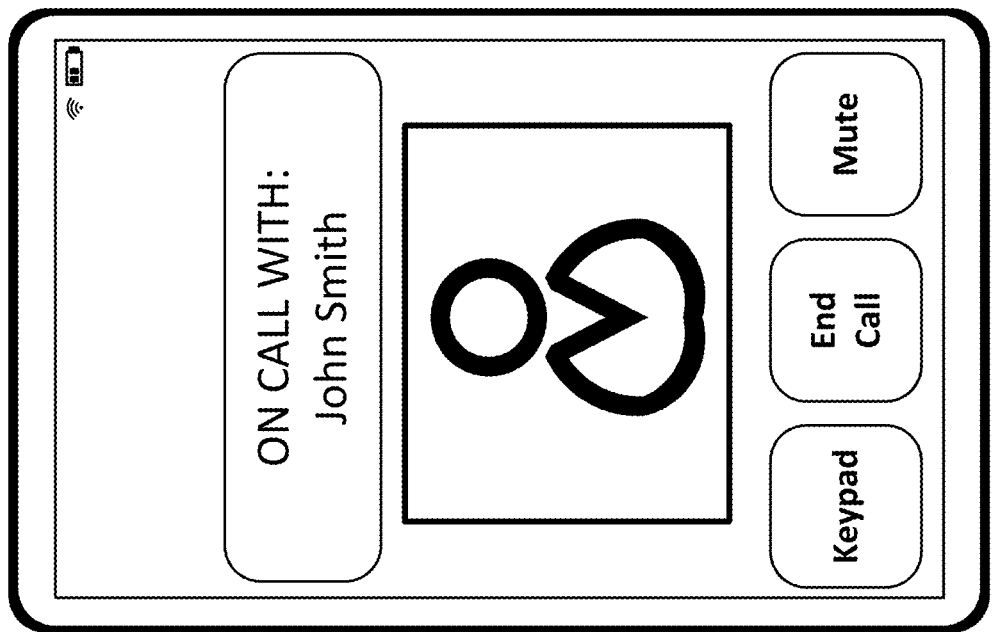
Figure 5B:
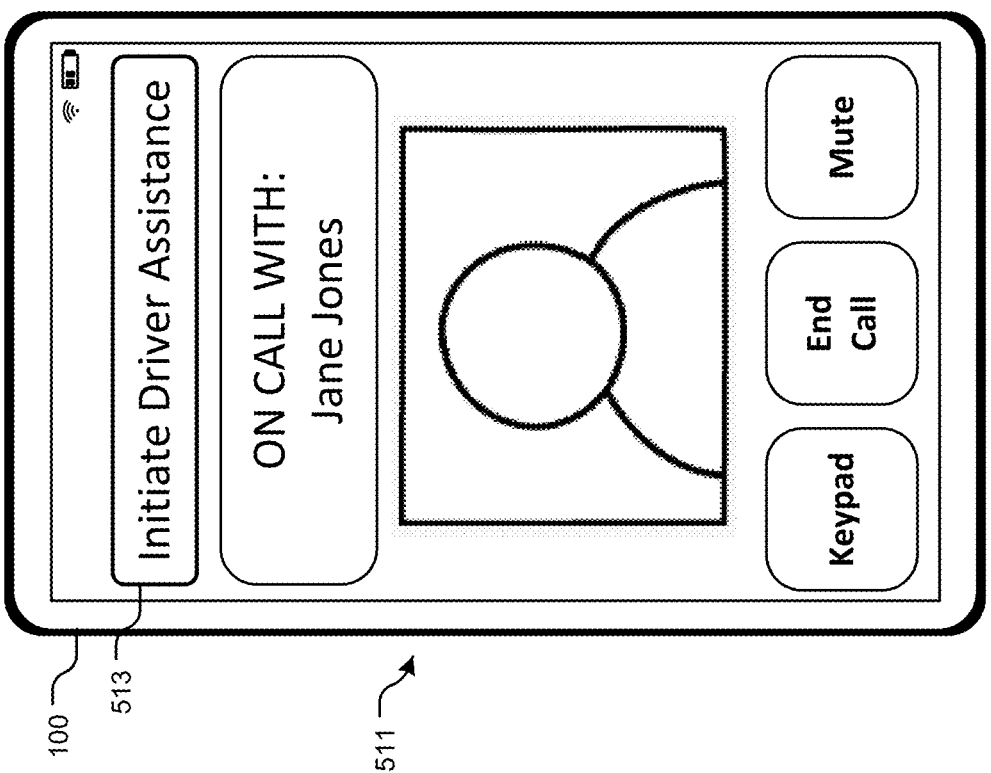

FIG. 5B shows the call-in-progress interface screens 511-512 of the computing devices 100, 150 while the telephone call is in progress. Jane is already at the restaurant and tells John the street address of the restaurant, but because John is driving, he does not want to manually input the address into the navigation application on his smartphone 100. John had previously identified Jane as a trusted contact, so his call-in-progress screen 511 displays a button 513 which, when selected by John, initiates a screen sharing "Driver Assistance" support session with Jane's computing device 150.

Figure 5C:
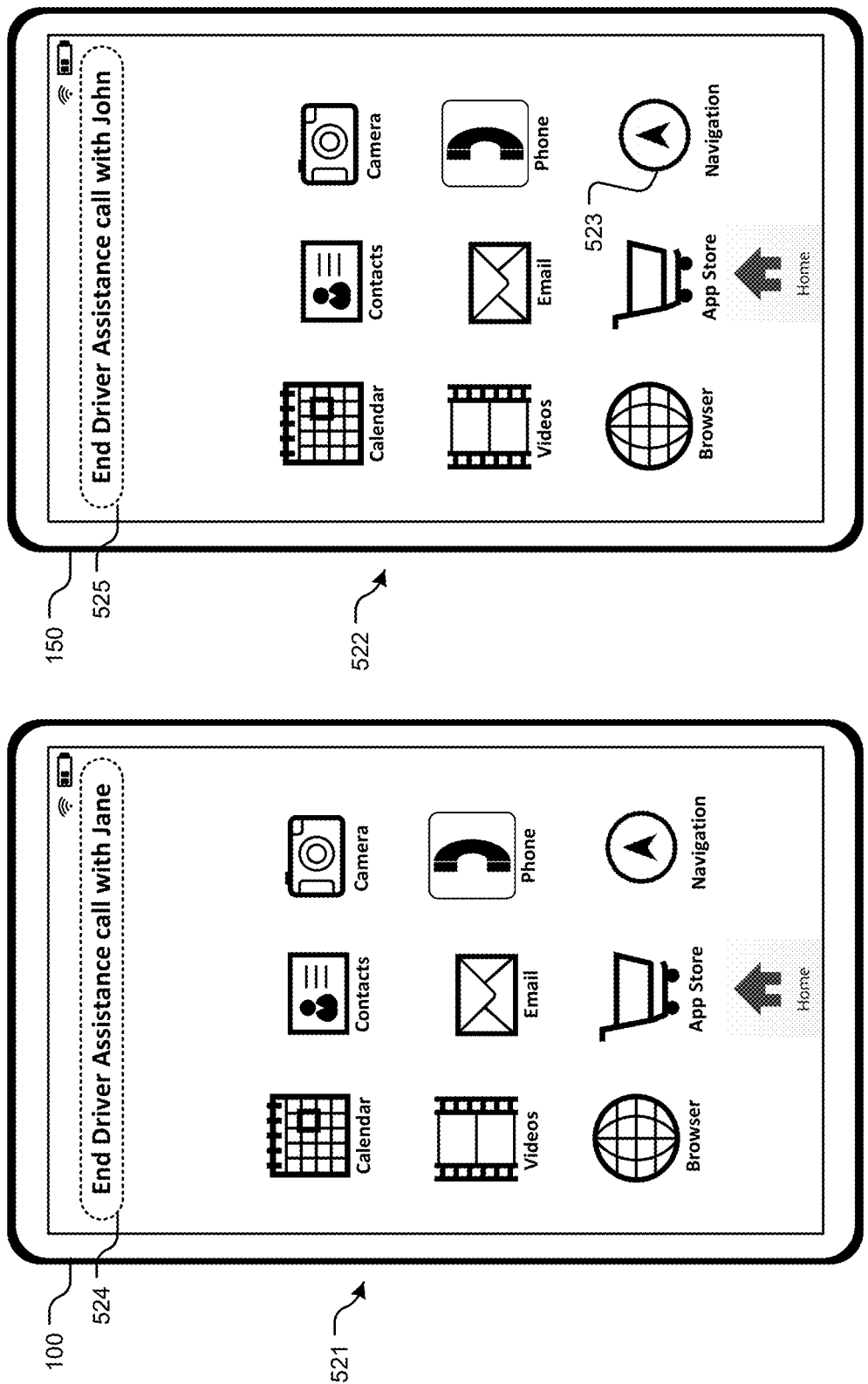

FIG. 5C shows the displays 521-522 of the computing devices 100, 150 after the screen sharing support session is established. During the support session, Jane's computing device 150 displays the UI content 104 currently being displayed on John's computing device 100, so the displays 521-522 may be identical. In some embodiments, the displays 521-522 may include an indicator 524-525 to remind the users that a screen sharing support session is in progress. The indicator 524 on John's computing device 100 helps to remind John that Jane is currently viewing his UI content 104, so he should avoid displaying any sensitive information on his device 100, such as passwords or private messages. The indicator 525 on Jane's computing device 150 helps to remind Jane that her inputs to her computing device 150 will be executed by John's computing device 100, not her own. In some embodiments, pressing either of the indicators 524-525 terminates the support session.

In the embodiment illustrated in FIG. 5C, Jane's computing device 150 has access to John's application launcher menu and one or more of the software applications on John's computing device 100. As a result, Jane can navigate through the applications in an application menu on John's computing device 100 to select the navigation icon 523, thereby causing John's computing device 100 to launch the navigation application.

Figure 5D:
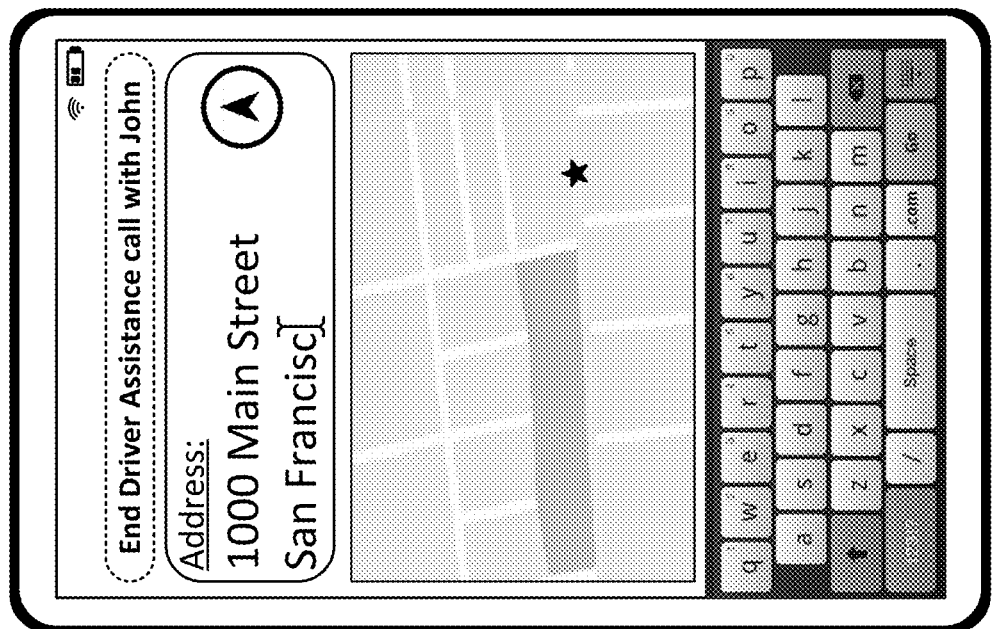
Figure 5D:
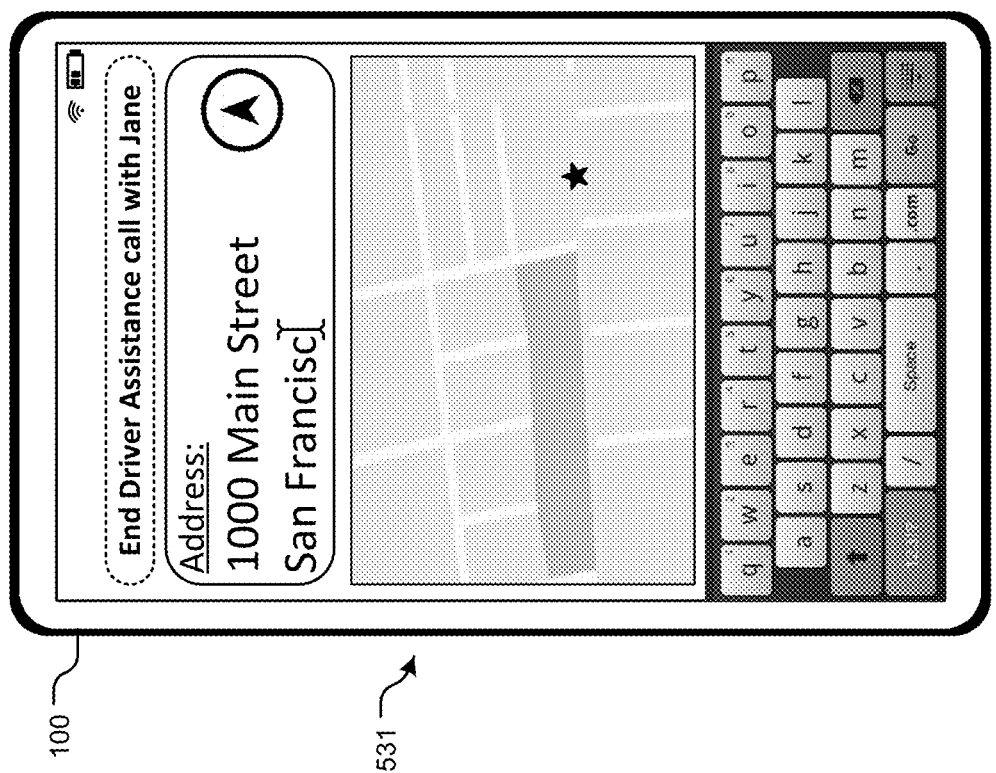

FIG. 5D shows the navigation application interface screen 531 on John's computing device 100 and the remote access navigation application interface screen 532 on Jane's computing device 150. As described above with respect to FIG. 1A, Jane may view John's current location, input the address of the destination into the navigation application, and initiate turn-by-turn directions by the navigation application to guide John to the restaurant. Alternatively, Jane may provide verbal navigation directions over the ongoing phone call. This may be useful when Jane does not know the exact street address of the destination, but can provide verbal instructions to John because she is able to observe his location in real time in the navigation interface screen 532.

Security may be a concern for users engaging in remote access support sessions. Accordingly, in some embodiments, it may be desirable to limit the remote access to the first computing device 100 to one or more specified software applications or functions, or to prohibit access to one or more software applications or functions. For example, in some embodiments, it may be desirable to limit the remote access support sessions to provide the second user with access to only the navigation application. In this case, the navigation application may include a button or other control element to initiate the support session. In other embodiments, the control element to initiate a support session may be provided in a pull-down menu in the device's interface. In some embodiments, when the first user selects the control element from the pull-down menu while running a software application, the remote support session may provide the second user with access to only that particular software application. In some embodiments, the user may utilize a settings menu to select in advance the applications and/or functionality to which the second user is granted access. Different access privileges may be assigned to each trusted contact, depending on the nature of the user's relationship with the trusted contact. A spouse, for example, may be provided with full access privileges, while a friend may be restricted to one or more specific applications. In other embodiments, the computing device 100 may present access privilege options to the first user at the time that the first user initiates the support session. For example, after the first user touches the button 513 to initiate the support session, the device 100 may present a menu of access options for selection by the first user (e.g., access only to the current application, access to predetermined non-sensitive applications, full access rights to the device 100, etc.).

In accordance with other embodiments of the present invention, other types of software applications may be viewed and/or controlled by a remote user. For example, the first user may wish to grant a trusted contact access to the music application on the first computing device 100. The trusted contact may use the second computing device 150 to navigate through the first user's music library and to select a song or playlist to be played by the first computing device 100. In other embodiments, the trusted contact may be granted access to any type of media content application, such as, e.g., a video player application or an e-book reader application. In other embodiments, the trusted contact may be granted access to a non-media content software application, such as, e.g., a web browser or shopping application, in order to permit the trusted contact to assist with a shopping purchase or other web browsing activity.

In some embodiments, the user may grant a trusted contact with access to a camera and/or camera application associated with the user's computing device. For example, the user may permit the trusted contact to access the camera application on the user's smartphone, thereby enabling the trusted contact to remotely view the images detected by cameras provided in the smartphone, e.g., the front-facing and/or rear-facing cameras. Access to the rear-facing camera may be particularly useful if the smartphone is mounted on the user's car dashboard or is otherwise positioned such that the rear-facing camera is directed to the road ahead of the user's car, thereby enabling the trusted contact to see the same thing as the user is seeing when looking out of the front windshield. This can enable the trusted contact to provide additional navigation assistance to the user. In other embodiments, the trusted contact may be granted access to one or more cameras in communication with the user's computing device. For example, the user's computing device may have a short-range wireless connection with the car, thereby enabling the computing device to receive images from cameras mounted on the car, e.g., cameras mounted onto the front or rear bumpers of the car. In this case, the trusted contact may also remotely view the images received by the user's computing device from the car. Similarly, the user's computing device may have a wired or wireless connection with another camera, such as a body-worn camera, hand-held camera, or camera mounted to the user's vehicle, and the trusted contact may have access to those cameras via the user's computing device, and can remotely control the operation of those cameras.

In accordance with other embodiments of the present invention, more than two computing devices may remotely access the other devices. For example, a first computing device may be granted access to a plurality of other computing devices, and may transmit control input data to that plurality of other computing devices. Each of those computing devices may then receive that control input data and execute those control inputs locally on that device. In one embodiment, this may be used to enable a plurality of friends to receive directions or a new destination location from one of those friends. For example, a group of friends may be driving in separate cars to meet at a restaurant. The first friend to arrive at the restaurant may discover that the restaurant is too busy to receive the entire group, so that first friend may select a different restaurant for their meeting location. The computing devices for each of the group of friends may identify the other friends as trusted contacts with permission to remote access those devices. The first friend may then send the new meeting location to the other friends in the group as a new destination address for the navigation application in each of those friends' computing devices. Those friends can then proceed to follow the directions provided by those navigation applications without having to manually input the new destination address themselves.

Figure 6:
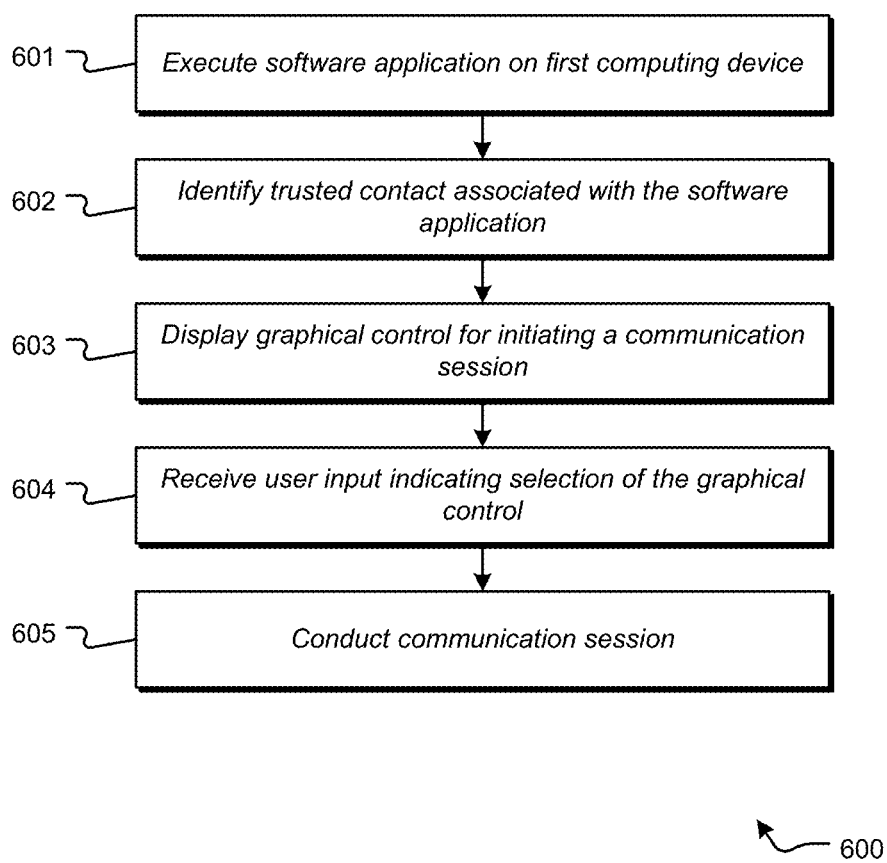
FIG. 6 is a flowchart illustrating a method of providing context-specific remote access to a computing device, in accordance with embodiments of the present invention.

FIG. 6 is a flowchart illustrating a method 600 of providing context-specific remote access to a first computing device 100, in accordance with embodiments of the present invention. In these embodiments, one or more trusted contacts may be associated with software applications residing on the first computing device. In step 601, the first user executes a software application on the first computing device 100. In step 602, the first computing device will determine whether a trusted contact is associated with the current context, e.g., the software application currently executing on the device 100. When such a trusted contact exists, in step 603 a graphical control, such as, e.g., a "Help" button or pull-down menu, is displayed on the first computing device 100. This graphical control may be overlaid the usual user interface of the software application, may be integrated into the user interface of that application, or may be provided in a pull-down menu or other interface element that does not interfere with the use of the software application. If the first user needs assistance with the software application and the "Help" button is displayed, in step 604 the computing device 100 receives a user input indicating that the first user has selected that "Help" button to cause the first computing device 100 to automatically contact the trusted contact. In step 604, communication session may then be established between the first computing device and a second computing device associated with the trusted contact, so that the trusted contact may provide the first user with the desired assistance.

Figure 7B:
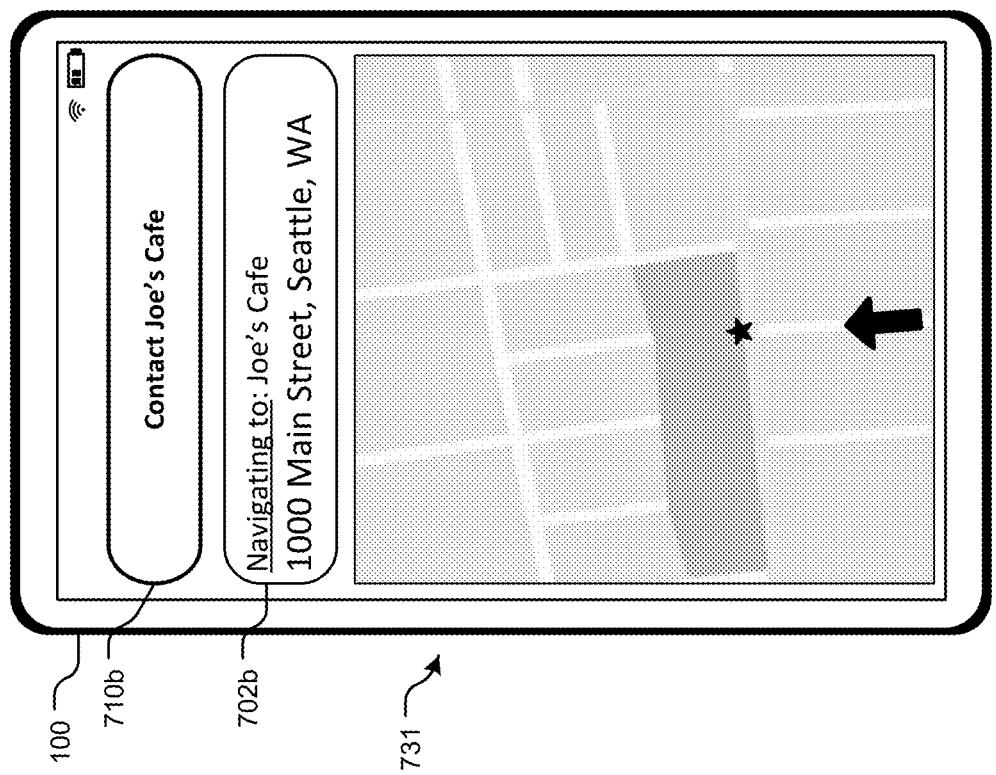
FIGS. 7A-7B are illustrative screenshots of a computing device providing context-specific support, in accordance with embodiments of the present invention.
Figure 7A:
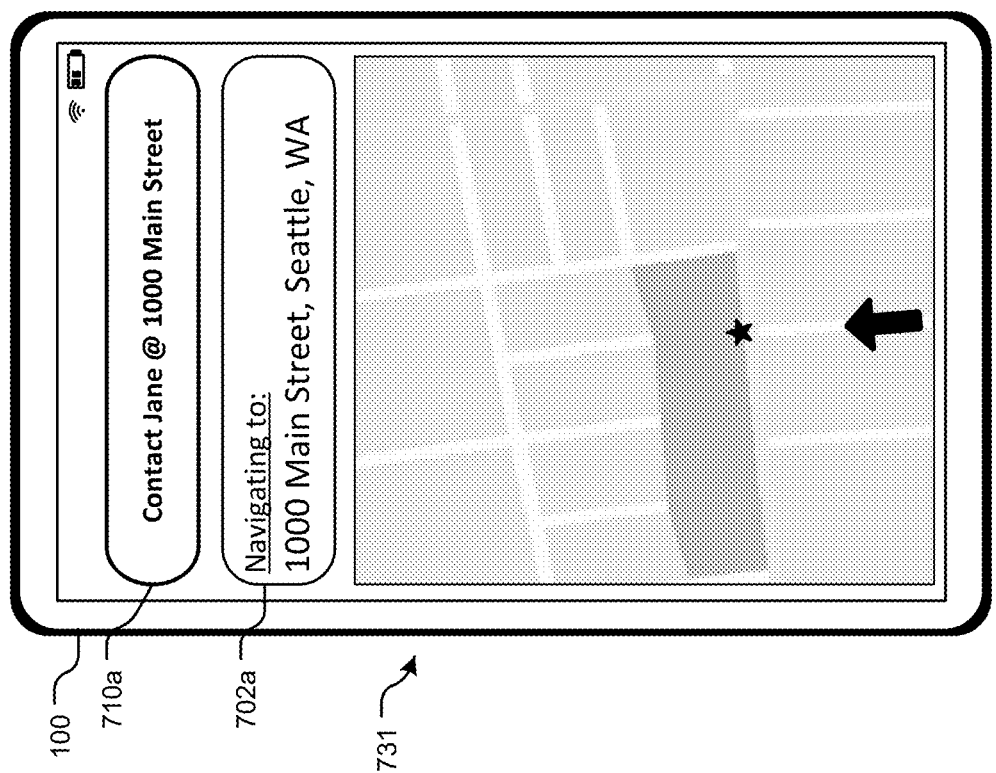

FIGS. 7A-7B are illustrative screenshots of a computing device 100 providing context-specific support, in accordance with embodiments of the present invention. In FIG. 7A, the user is operating the navigation application on the first computing device 100 and FIG. 7A shows the navigation application interface screen 731. Destination window 702a displays the current destination address for the navigation application. In this embodiment, the first computing device 100 is configured to search the user's contact database to identify any contacts having addresses associated with the current destination. In the embodiment illustrated in FIG. 7A, the device 100 has identified a contact, "Jane," having a home address identical to the current destination. This identification may be performed by the navigation application 241, by the remote access application 202, or any other software on the device 100. If a contact is identified as being associated with the current destination, a graphical control, e.g., "Help" button 710a, is displayed. This "Help" button 710a prompts the user to select the button 710a if the user wishes to establish a communication session with Jane at the destination address. This may be helpful, for example, if the user is navigating to Jane's home and wishes to contact Jane, e.g., to let Jane know that the user will be arriving shortly or to ask Jane about the best location to park.

Any type of communication session may be established. In some embodiments, the communication session comprises a voice phone call to the phone number listed for Jane in the user's contact database. In other embodiments, the communication session may comprise a screen sharing session with Jane's smartphone or other computing device, as described above. During this screen sharing session, Jane may be able to transmit control inputs to the computing device 100 to enter a new destination address into the navigation application 241, such as the address for a nearby parking garage. The navigation application 241 on the computing device 100 will then provide the user with directions to the parking garage identified by Jane. In other embodiments, Jane may be able to provide inputs to the user computing device 100 using voice commands. For example, the device 100 may monitor the audio of the communication session with Jane to a predetermined "wake" word. After detecting the "wake" word from Jane, the device 100 may then monitor the subsequent audio for commands that may be executed on the device 100, such as, e.g., a verbally spoken destination address.

Different methods may be used for identifying the contact with whom a communication session may be established. For example, the user may preselect one or more trusted contacts with whom communication sessions may be established. Thus, if Jane had not be preselected by the user, the graphical control 710a would not be displayed or would display a different trusted contact who had been preselected.

In other embodiments, the computing device 100 will determine whether a contact associated with the destination address has a computing device configured to establish the desired communication session (e.g., that remote access application 161' is installed on Jane's smartphone). If not, then the graphical control 710a would not be displayed or would display a different trusted contact having remote access application 161'.

In some embodiments, one or more trusted contacts may be associated with specific software applications on the user computing device 100. For example, all of the user's friends may be associated with the navigation application 241, so that the user may establish communication sessions with any of the user's friends by selecting the graphical control 710a. However, the computing device 100 may include a shopping application and the user may assign only the user's spouse or other more limited list of contacts who are trusted to assist with purchases using the shopping application. In some embodiments, certain applications may be designated as restricted, whereby anyone conducting a screen sharing session or other communication session with the user computing device 100 would be prohibited from accessing those restricted applications.

FIG. 7B shows a navigation application interface screen 731 in which the destination shown in window 702b includes the name of a business located at the destination, e.g., Joe's Café, as shown in FIG. 7B. The computing device 100 may be programmed to determine whether that business is configured to conduct communication sessions with the computing device 100. That business may, for example, have registered with an online database indicating the communication session capability. As a result, the graphical control 710b is displayed, prompting the user to select the control 710b if the user wishes to establish a communication session with Joe's Café, e.g., to place a voice phone call, video call, or screen sharing session with Joe's Café.

In some embodiments, if there are no trusted contacts associated with a software application executing on the user computing device 100, the computing device 100 may display a graphical control for establishing a communication session with a predetermined support service. For example, if the user is navigating to a destination address with which the user has no trusted contacts, the navigation application may display a graphical control for contacting a support service associated with, e.g., the user's mobile phone carrier, mobile phone manufacturer, or other service provider.

Figure 8:
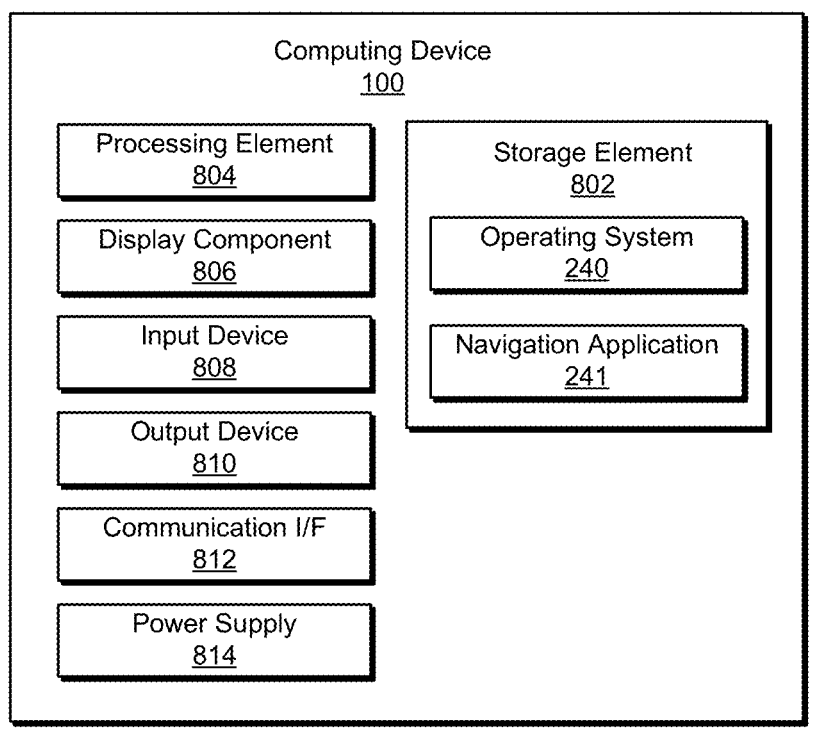
FIG. 8 illustrates an exemplary block diagram of a computing device which may be used in accordance with embodiments of the present invention.

FIG. 8 illustrates an exemplary block diagram of a computing device which may be used as computing device 100 or computing device 150, in accordance with embodiments of the present invention. The computing device may be implemented as any of a number of electronic devices, such as an e-book reader, a tablet computing device, a smartphone, a media player, a portable gaming device, a portable digital assistant, a laptop computer, a desktop computer, or other devices providing voice calling functionality. It should be understood that various types of computing devices including a processing element, a memory, and a UI for receiving user input can be used in accordance with various embodiments discussed herein. The electronic device 100 may not necessarily be a mobile or portable device, and thus, in some implementations may comprise a desktop personal computer, a gaming system, a television, and other stationary home electronics devices.

The computing device 100 may include a display component 806. The display component 806 may comprise, for example, one or more devices such as cathode ray tubes (CRTs), liquid crystal display (LCD) screens, gas plasma-based flat panel displays, LCD projectors, or other types of display devices, etc.

The computing device 100 may include one or more input devices 808 operable to receive inputs from a user. The input devices 808 can include, for example, a push button, touch pad, touch screen, wheel, joystick, keyboard, mouse, trackball, keypad, accelerometer, light gun, game controller, or any other such device or element whereby a user can provide inputs to the computing device 100. These input devices 808 may be incorporated into the computing device 100 or operably coupled to the computing device 100 via wired or wireless interface. For computing devices with touchscreen displays, the input devices 808 can include a touch sensor that operates in conjunction with the display component 806 to permit users to interact with the image displayed by the display component 806 using touch inputs (e.g., with a finger or stylus).

The computing device 100 may also include at least one communication interface 812, comprising one or more wireless components operable to communicate with one or more separate devices within a communication range of the particular wireless protocol. The wireless protocol can be any appropriate protocol used to enable devices to communicate wirelessly, such as Bluetooth, cellular, IEEE 802.11, or infrared communications protocols, such as an IrDA-compliant protocol. It should be understood that the computing device 100 may also include one or more wired communications interfaces for coupling and communicating with other devices.

The computing device 100 may also include a power supply 814, such as, for example, a rechargeable battery operable to be recharged through conventional plug-in approaches or through other approaches, such as capacitive charging.

The computing device 100 also includes a processing element 804 for executing instructions and retrieving data stored in a storage element 802. The storage element 802 may store software for execution by the processing element 804, such as, for example, operating system software 240 and navigation application 241. As would be apparent to one of ordinary skill in the art, the storage element 802 can include one or more different types of memory, data storage or computer-readable storage media, such as, for example, a first data storage for program instructions for execution by the processing element 804, a second data storage for images or data and/or a removable storage for transferring data to other devices.

Embodiments of the present invention may provide various advantages not provided by prior art systems. The remote access support sessions provide a second user with a near real-time view of the UI content 104 being displayed on the first user's device. This can provide more useful information to the second user than if the first computing device 100 sent a more limited amount of information to the second computing device 150, such as sending only the current location information of the first computing device 100. By enabling the second user to view the same content that is currently being viewed by the first user, the second user may be able to provide a greater level of assistance to the first user.

While the invention has been described in terms of particular embodiments and illustrative figures, those of ordinary skill in the art will recognize that the invention is not limited to the embodiments or figures described. Many of the embodiments described above relate to casual voice calls and support sessions with a computing device operated by a friend or family member. In other embodiments, the voice calls and support sessions may be with a business or for commercial purposes. For example, second computing device may be operated by a commercial establishment, such as a restaurant or retail store. The first computing device may call a phone number associated with that establishment to obtain assistance with navigating to that establishment.

Although various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application-specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processing component in a computer system. If embodied in hardware, each block may represent a circuit or a number of interconnected circuits to implement the specified logical function(s).

Although the processes, flowcharts, and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computer-implemented method of providing support to a user at a mobile user computing device, the method comprising:
    executing a navigation application on the mobile user computing device to provide directions to a destination address;
    initiating a voice call to a first trusted contact associated with a first remote computing device;
    determining by the mobile user computing device that the first trusted contact has access privileges to the mobile user computing device;
    displaying a graphical control on a phone interface screen displayed on a display of the mobile user computing device during the voice call, the graphical control effective to initiate a communication session over a wireless computer network between the user computing device and the first remote computing device associated with the first trusted contact, wherein the graphical control is displayed in response to the determination that the first trusted contact has access privileges to the mobile user computing device;
    receiving at the user computing device a user input indicating selection of the graphical control; and
    conducting the communication session over the wireless computer network between the user computing device and the first remote computing device.

2. The method of claim 1, further comprising:
    determining that the first remote computing device has a communications application with capability to conduct the communication session with the user computing device; and
    wherein the conducting the communication session between the user computing device and the first remote computing device comprises establishing a connection between the user computing device and the communications application of the first remote computing device.

3. The method of claim 1, wherein the conducting the communication session comprises:
    sending data representing user interface (UI) content of the navigation application to the first remote computing device;
    receiving at the user computing device from the first remote computing device control input data corresponding to a new destination address; and
    executing the navigation application on the user computing device to provide directions to the new destination address.

4. A computer-implemented method of providing support to a user at a user computing device, the method comprising:
    initiating a voice call to a first contact profile associated with a first remote computing device;
    determining by the user computing device that the first contact profile has access privileges to the user computing device;
    displaying a graphical control during the voice call, the graphical control effective to initiate a communication session over a wireless computer network between the user computing device and the first remote computing device, wherein the graphical control is displayed in response to the determination that the first contact profile has access privileges to the user computing device;
    receiving at the user computing device over the wireless computer network a user input indicating selection of the graphical control;
    displaying user interface (UI) content on a display of the user computing device;
    sending UI data representing at least a portion of the UI content displayed on the display of the user computing device to the first remote computing device over the wireless computer network, wherein the first remote computing device is effective to display the UI data;
    receiving, at the user computing device from the first remote computing device over the wireless computer network, control input data; and
    executing, by the user computing device, control inputs associated with the control input data.

5. The method of claim 4, further comprising:
    determining that the first remote computing device has capability to conduct the communication session with the user computing device; and
    further comprising establishing a connection over the wireless computer network between the user computing device and a communications application of the first remote computing device.

6. The method of claim 4, further comprising determining that the first contact profile has access privileges to a navigation application of the user computing device, wherein the displaying the graphical control comprises displaying a button for initiating the communication session after determining that the first contact profile has access privileges to the navigation application.

7. The method of claim 4, further comprising:
    prohibiting the first remote computing device from accessing one or more applications on the user computing device according to the access privileges of the first contact profile.

8. The method of claim 4, further comprising:
    receiving at the user computing device from the first remote computing device a voice command; and
    executing the voice command in the user computing device.

9. The method of claim 4, further comprising:
    identifying a second contact profile that has access privileges to the user computing device and is different that the first contact profile;
    displaying a second graphical control for initiating a second communication session between the user computing device and a second remote computing device;
    receiving at the user computing device a second user input indicating selection of the second graphical control; and
    establishing the second communication session between the user computing device and the second remote computing device.

10. The method of claim 4, further comprising:
executing a software application on the user computing device;
determining that there are no contact profiles associated with the software application; and
displaying a second graphical control for initiating a second communication session between the user computing device and a predetermined support service.

11. The method of claim 4, wherein the receiving at the user computing device the user input indicating selection of the graphical control comprises receiving a voice command at the user computing device instructing the user computing device to initiate the communication session with the first remote computing device.

12. The method of claim 4, further comprising initiating a video call to the first remote computing device associated with the first contact profile.

13. The method of claim 4, further comprising:
executing a shopping application on the user computing device; and
determining a second contact profile identified as a trusted contact for the shopping application, wherein the second contact profile is associated with a second remote computing device.

14. The method of claim 13, further comprising:
receiving control input data from the second remote computing device, the control input data corresponding to selection of an item to purchase in the shopping application; and
executing the shopping application on the user computing device to purchase the item.

15. The method of claim 13, further comprising:
determining that the first remote computing device has capability to conduct the communication session with the user computing device.

16. The method of claim 13, further comprising:
determining that the first remote computing device has a communications application with capability to conduct the communication session with the user computing device.

17. The method of claim 4, further comprising:
determining a plurality of contact profiles with access privileges to the user computing device;
displaying the graphical control for initiating the communication session between the user computing device and a plurality of remote computing devices associated with the plurality of contact profiles; and
sending UI data to the plurality of remote computing devices.

18. The method of claim 4, further comprising receiving, at the user computing device from the first remote computing device, control input data generated by the first remote computing device based on user interaction with the UI data sent to the first remote computing device.

19. The method of claim 4, further comprising:
executing, by the user computing device, a navigation application, wherein the UI data comprises data representing a map, and the control input data is a new destination address command generated by the first remote computing device based on user interaction with the UI data and executable by the user computing device; and
executing the control input data on the user computing device to provide directions to a new destination address associated with the new destination address command.

20. The method of claim 4, further comprising:
receiving at the user computing device from the first remote computing device graphical image data; and
displaying by the user computing device on the display the graphical image data in an at least partially transparent support content layer overlaying the UI content.

21. The method of claim 4, wherein user computing device is a mobile user device and the access privileges allow access to data stored on the user computing device and allow for control inputs to be sent to the user computing device for execution by the user computing device.

* * * * *